US008205668B2

(12) United States Patent
Freese, V

(10) Patent No.: US 8,205,668 B2
(45) Date of Patent: Jun. 26, 2012

(54) HEAT EXCHANGER WITH DISIMILAR METAL PROPERTIES

(75) Inventor: Charles E. Freese, V, Ira Township, MI (US)

(73) Assignee: GM Global Technology Operations LLC

( * ) Notice: Subject to any disclaimer, the term of this patent is extended or adjusted under 35 U.S.C. 154(b) by 1037 days.

(21) Appl. No.: 12/144,700

(22) Filed: Jun. 24, 2008

(65) Prior Publication Data

US 2009/0313972 A1 Dec. 24, 2009

(51) Int. Cl.
*G05D 7/01* (2006.01)

(52) U.S. Cl. ........................................ 165/300; 165/166

(58) Field of Classification Search .................. 165/287, 165/300, 166, 167
See application file for complete search history.

(56) References Cited

U.S. PATENT DOCUMENTS

| | | | | | |
|---|---|---|---|---|---|
| 1,459,318 | A | * | 6/1923 | Birdsall | 236/35.2 |
| 3,280,906 | A | * | 10/1966 | Rosenblad | 165/166 |
| 3,438,430 | A | * | 4/1969 | Kestemont | 165/277 |
| 3,513,881 | A | * | 5/1970 | Kinsell | 138/45 |
| 3,814,172 | A | * | 6/1974 | Shore | 165/303 |
| 3,831,396 | A | * | 8/1974 | Donaldson et al. | 62/467 |
| 4,303,123 | A | * | 12/1981 | Skoog | 165/166 |
| 4,406,323 | A | * | 9/1983 | Edelman | 165/84 |
| 4,501,319 | A | * | 2/1985 | Edelman et al. | 165/84 |
| 4,860,729 | A | * | 8/1989 | Benson et al. | 126/400 |
| 5,033,537 | A | * | 7/1991 | Atkin et al. | 165/282 |
| 2004/0262852 | A1 | * | 12/2004 | Vafai et al. | 277/628 |

* cited by examiner

*Primary Examiner* — Allen Flanigan
(74) *Attorney, Agent, or Firm* — Harness, Dickey & Pierce, P.L.C.

(57) ABSTRACT

An exhaust gas recirculation cooler may include a housing and a first wall. The housing may include an exhaust gas region, a coolant region, an exhaust gas inlet, and an exhaust gas outlet. The first wall may be fixed within the housing and may separate the exhaust gas region from the coolant region. The first wall may include a first portion formed from a first material and facing the exhaust gas region and a second portion formed from a second material and facing the coolant region. One of the first and second materials may have a coefficient of thermal expansion that is greater than the other of the first and second materials. The first wall may be deflected toward one of the exhaust gas region and the coolant region during cooler operation based on a difference in the coefficient of thermal expansion of the first and second materials.

20 Claims, 5 Drawing Sheets

HEAT EXCHANGER WITH DISIMILAR METAL PROPERTIES

RELATED APPLICATION

This application is a continuation of U.S. patent application Ser. No. 10/513,160, filed Oct. 29, 2004, now U.S. Pat. No. 7,399,600, which is the national filing of International Application No. PCT/GB03/01827, filed Apr. 29, 2003, claiming priority to British Application No. 0209666.7 filed Apr. 29, 2002.

FIELD

The present disclosure relates to heat exchangers, and more specifically to an exhaust gas recirculation cooler.

BACKGROUND

Engine assemblies may include exhaust gas recirculation systems to reduce exhaust emissions. Exhaust gas recirculation systems may include a heat exchanger to reduce a temperature of recirculated exhaust gas. In diesel engines, a particulate matter may be present in the exhaust gas. The particulate matter may contaminate the heat exchanger, reducing heat transfer between the exhaust gas and the heat exchanger as well as restricting exhaust gas flow through the heat exchanger.

SUMMARY

An exhaust gas recirculation cooler may include a housing and a first wall. The housing may include an exhaust gas region, a coolant region, an exhaust gas inlet that provides communication between an exhaust gas from an engine and the exhaust gas region, and an exhaust gas outlet that provides communication between the exhaust gas region and an engine intake air supply. The first wall may be fixed within the housing and may separate the exhaust gas region from the coolant region. The first wall may include a first portion formed from a first material and facing the exhaust gas region and a second portion formed from a second material and facing the coolant region. One of the first and second materials may have a coefficient of thermal expansion that is greater than the other of the first and second materials. The first wall may be deflected toward one of the exhaust gas region and the coolant region during cooler operation based on a difference in the coefficient of thermal expansion of the first and second materials.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
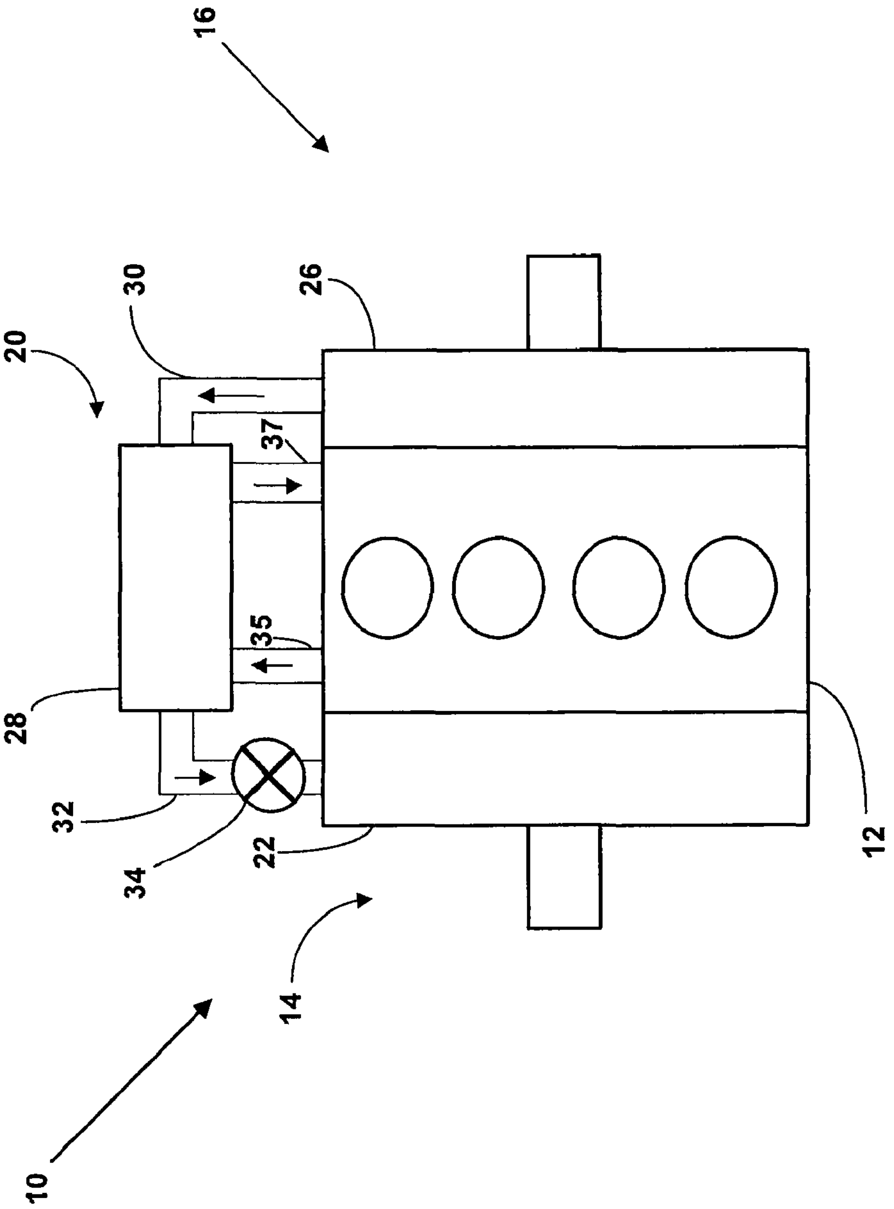
FIG. 1 is a schematic illustration of an engine assembly according to the present disclosure.

The following description is merely exemplary in nature and is not intended to limit the present disclosure, application, or uses. It should be understood that throughout the drawings, corresponding reference numerals indicate like or corresponding parts and features.

Referring to FIG. 1, an exemplary engine assembly 10 is schematically illustrated. Engine assembly 10 may include a diesel engine 12 in communication with an intake system 14, an exhaust system 16 and an exhaust gas recirculation (EGR) system 20. Intake system 14 may include an intake manifold 22 and may control an air flow into engine 12. Exhaust system 16 may include an exhaust manifold 26 in communication with exhaust gas created by combustion. The exhaust gas may exit engine 12 through exhaust system 16.

EGR system 20 may provide selective communication between intake system 14 and exhaust system 16. EGR system 20 may include an EGR cooler 28, exhaust gas inlet and outlet lines 30, 32, an EGR valve 34 and coolant inlet and outlet lines 35, 37. Exhaust gas inlet line 30 may provide fluid communication between exhaust manifold 26 and EGR cooler 28 and exhaust gas outlet line 32 may provide fluid communication between EGR cooler 28 and intake manifold 22. EGR valve 34 may be disposed between EGR cooler 28 and intake manifold 22 and may selectively control an amount of exhaust gas provided to intake manifold 22. Coolant inlet and outlet lines 35, 37 may be in communication with a cooling system (not shown) of engine 12 and may provide engine coolant flow to and from EGR cooler 28.

Figure 2:
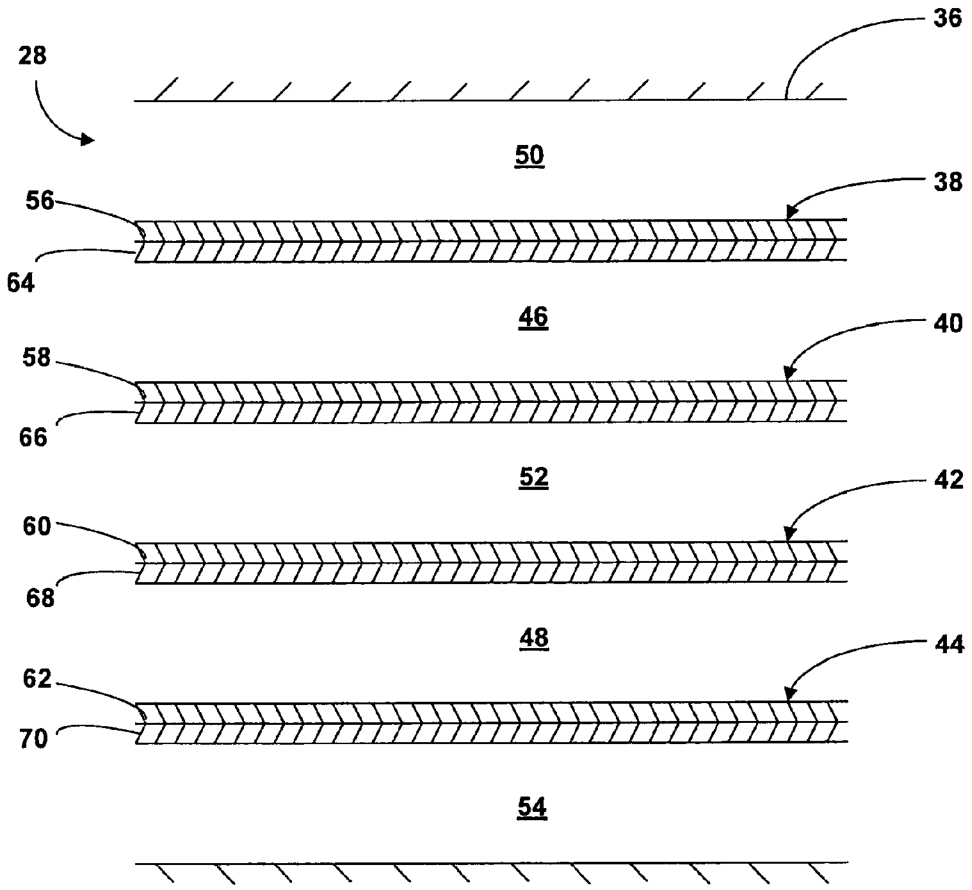
FIG. 2 is a schematic illustration of the cooler of the engine assembly shown in FIG. 1.

With reference to FIG. 2, EGR cooler 28 may be a plate-type cooler including an outer housing 36 having a series of walls 38, 40, 42, 44 fixed therein. It is understood that the structure of EGR cooler 28 may be applied to a variety of cooler applications, such as industrial coolers. Housing 36 and walls 38, 40, 42, 44 may cooperate to form a series of exhaust gas regions 46, 48 and a series of coolant regions 50, 52, 54. Ends of walls 38, 40, 42, 44 may be fixed within housing 36 to isolate exhaust gas regions 46, 48 and coolant regions 50, 52, 54 from one another. Exhaust gas regions 46, 48 may be communication with exhaust gas inlet and outlet lines 30, 32 and coolant regions 50, 52, 54 may be in communication with coolant inlet and outlet lines 35, 37.

Each of walls 38, 40, 42, 44 may include a first portion 56, 58, 60, 62 and a second portion 64, 66, 68, 70, respectively, generally opposite one another. First portion 56 may generally face coolant region 50, first portion 60 and second portion 66 may generally face coolant region 52 and one another, and second portion 70 may generally face coolant region 54. First portion 58 and second portion 64 may generally face exhaust gas region 46 and one another. First portion 62 and second portion 68 may generally face exhaust gas region 48 and one another.

Materials used to form first and second portions 56, 58, 60, 62 and 64, 66, 68, 70 may be varied. For example, first portions 56, 60 and second portions 66, 70 may be formed from a first material. First portions 58, 62 and second portions 64, 68 may be formed from a second material. The first and second materials may have different coefficients of thermal expansion. First portions 56, 58, 60, 62 and second portions 64, 66, 68, 70 may be coupled in a variety of ways including brazing in order to prevent separation based on the different coefficients of thermal expansion.

Figure 3:
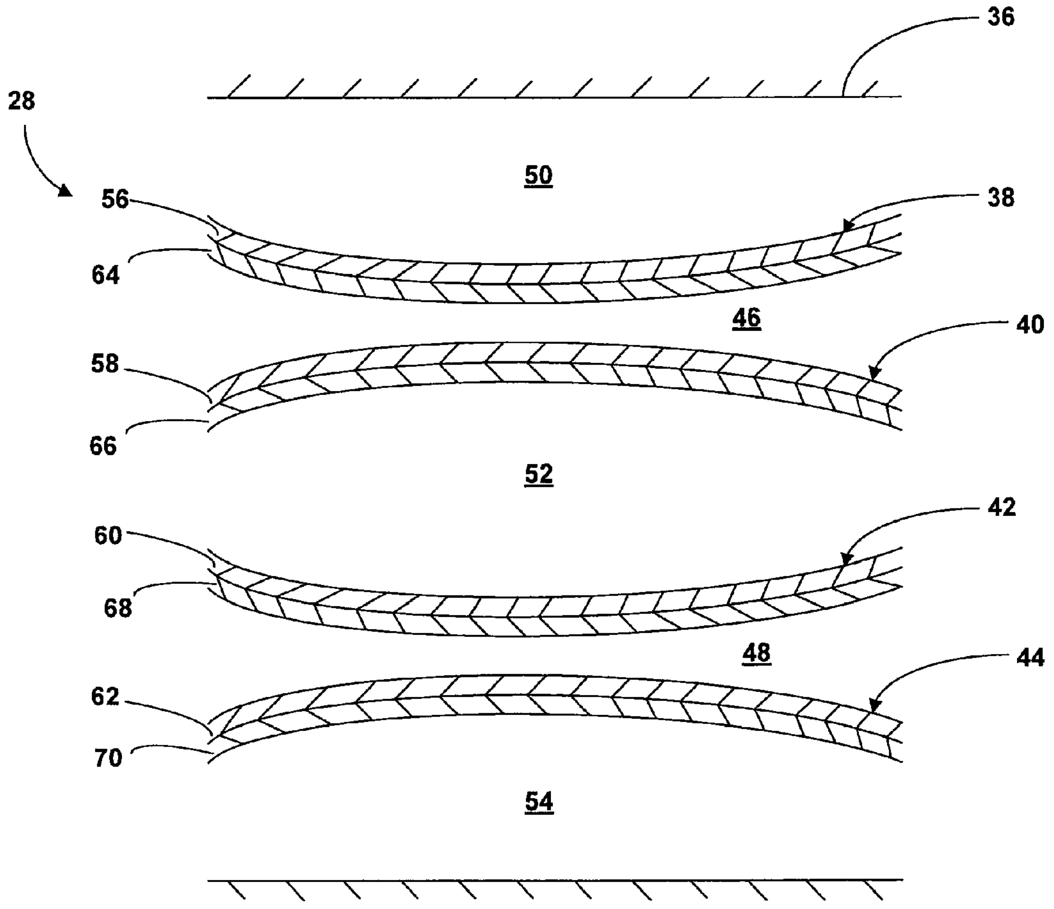
FIG. 3 is a schematic illustration of a first arrangement of the cooler of FIG. 2.

With reference to FIG. 3, EGR cooler 28 is schematically illustrated during operation where coolant and exhaust gas pass through EGR cooler 28 and where the first material has a coefficient of thermal expansion that is less than the second material. For example, the first material may include iron and the second material may include aluminum. Based on the difference in thermal expansion between the first and second materials, walls 38, 40 may deflect toward one another, walls 40, 42 may deflect away from one another, and walls 42, 44 may deflect toward one another.

Walls 38, 40 may deflect into exhaust gas region 46 and walls 42, 44 may deflect into exhaust gas region 48. Wall 38 may deflect away from coolant region 50, walls 40, 42 may deflect away from coolant region 52, and wall 44 may deflect away from coolant region 54. More specifically, wall 38 may deflect in a direction generally perpendicular to an outer surface of second portion 64, wall 40 may deflect in a direction generally perpendicular to an outer surface of first portion 58, wall 42 may deflect in a direction generally perpendicular to an outer surface of second portion 68, and wall 44 may deflect in a direction generally perpendicular to an outer surface of first portion 62.

As a result, exhaust gas regions 46, 48 may have an increased flow restriction relative to a non-operating condition of EGR cooler 28 (shown in FIG. 2). Correspondingly, coolant regions 50, 52, 54 may have a decreased flow restriction relative to a non-operating condition of EGR cooler 28. Deflection of walls 38, 40, 42, 44 may remove particulate exhaust matter therefrom. The flow restriction of exhaust gas may increase exhaust gas velocities, further assisting in removal of particulate matter from walls 38, 40, 42, 44. The decreased flow restriction of coolant may change the heat transfer characteristics in coolant regions 50, 52, 54.

Figure 4:
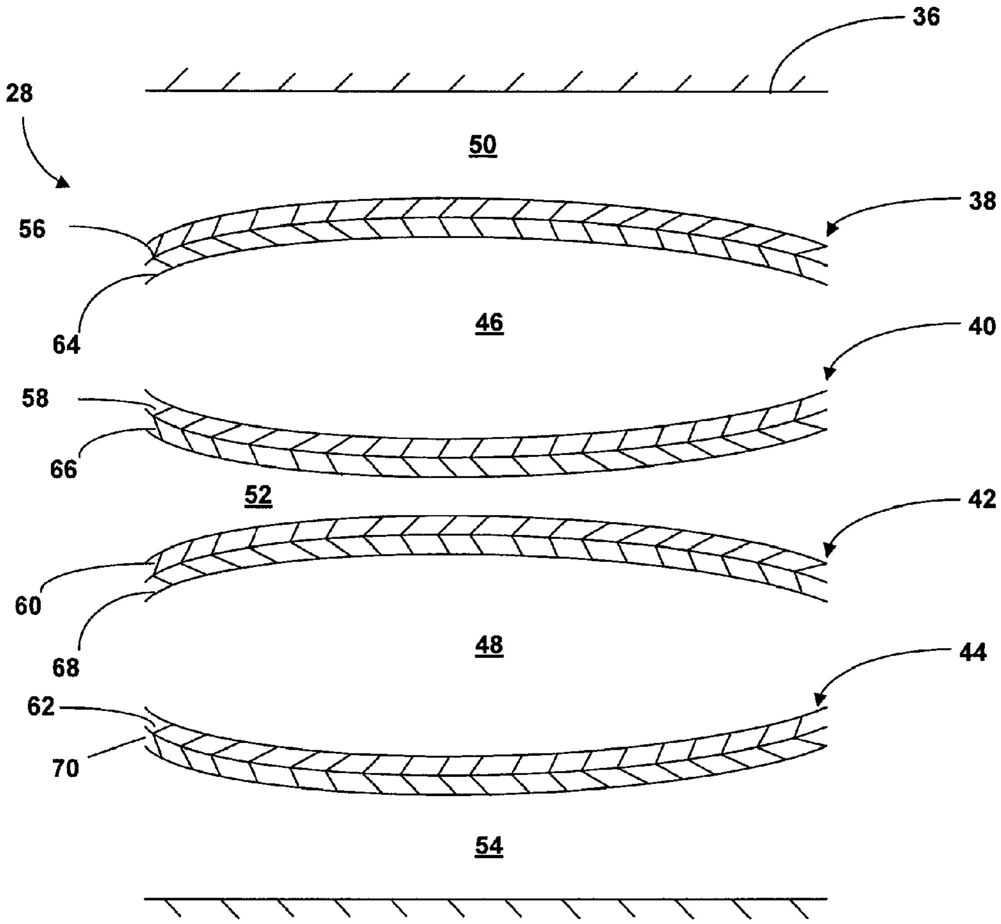
FIG. 4 is a schematic illustration of a second arrangement of the cooler of FIG. 2.

Alternatively, with reference to FIG. 4, EGR cooler 28 is schematically illustrated during operation where coolant and exhaust gas pass through EGR cooler 28 and where the first material has a coefficient of thermal expansion that is greater than the second material. For example, the first material may include aluminum and the second material may include iron. Based on the difference in thermal expansion between the first and second materials, walls 38, 40 may deflect away from one another, walls 40, 42 may deflect toward from one another, and walls 42, 44 may deflect away from one another.

Wall 38 may deflect into coolant region 50, walls 40, 42 may deflect into coolant region 52, and wall 44 may deflect into coolant region 54. Wall 38, 40 may deflect away from exhaust gas region 46 and walls 42, 44 may deflect away from exhaust gas region 48. More specifically, wall 38 may deflect in a direction generally perpendicular to an outer surface of first portion 56, wall 40 may deflect in a direction generally perpendicular to an outer surface of second portion 66, wall 42 may deflect in a direction generally perpendicular to an outer surface of first portion 60, and wall 44 may deflect in a direction generally perpendicular to an outer surface of second portion 70.

As a result, exhaust gas regions 46, 48 may have a decreased flow restriction relative to a non-operating condition of EGR cooler 28 (shown in FIG. 2). Correspondingly, coolant regions 50, 52, 54 may have an increased flow restriction relative to a non-operating condition of EGR cooler 28. The flow restriction of coolant may change the heat transfer characteristics in coolant regions 50, 52, 54. Deflection of walls 38, 40, 42, 44 may remove particulate exhaust matter therefrom.

Figure 5:
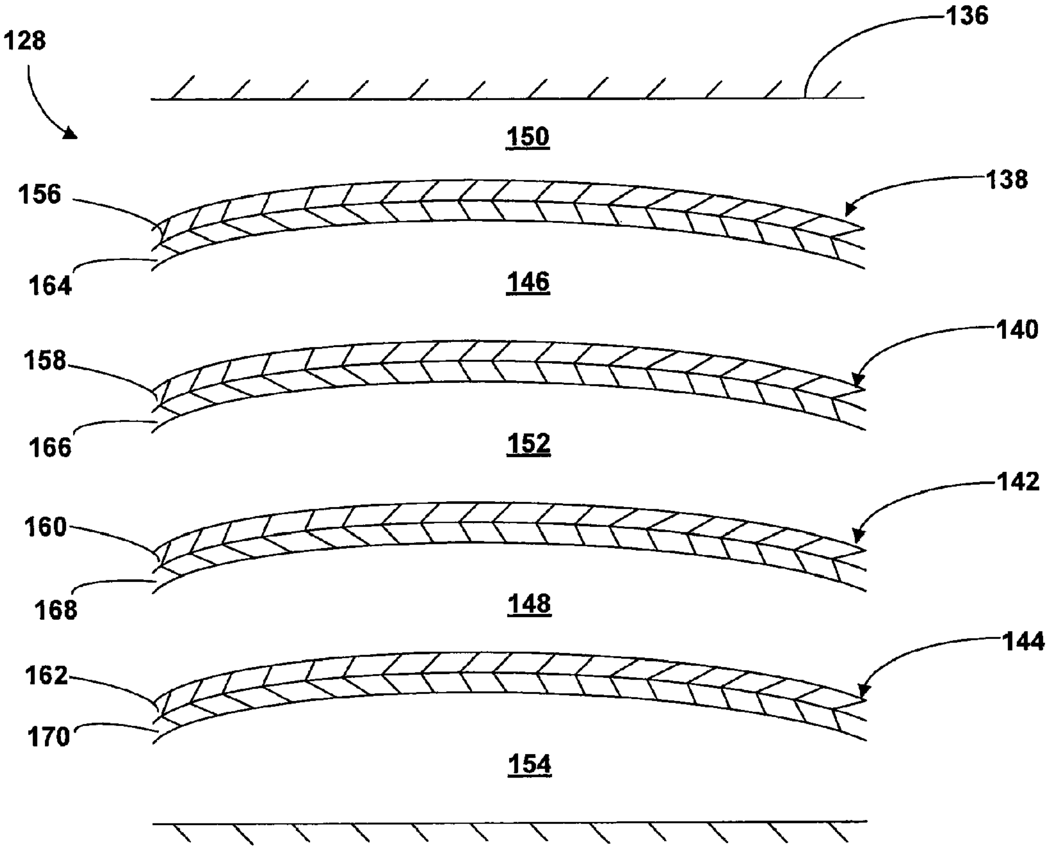
FIG. 5 is a schematic illustration of an alternate cooler according to the present disclosure.

With reference to FIG. 5, an alternate EGR cooler 128 is schematically illustrated during operation where coolant and exhaust gas pass through EGR cooler 128 and where each of first portions 156, 158, 160, 162 may be formed from a first material and each of second portions 164, 166, 168, 170 may be formed from a second material. The first material may have a coefficient of thermal expansion that is greater than the second material. For example, the first material may include aluminum and the second material may include iron. Based on the difference in thermal expansion between the first and second materials, walls 138, 140, 142, 144 may all deflect in a direction generally similar to one another.

Wall 138 may deflect into coolant region 150 and away from exhaust gas region 146, wall 140 may deflect into exhaust gas region 146 and away from coolant region 152, wall 142 may deflect into coolant region 152 and away from exhaust gas region 148, and wall 144 may deflect into exhaust gas region 148 and away from coolant region 154. More specifically, walls 138, 140, 142, 144 may each deflect in a direction generally perpendicular to an outer surface of first portions 156, 158, 160, 162, respectively.

Since walls 138, 140, 142, 144 each deflect in generally the same direction, the first and second materials may be reversed and accomplish the same result. More specifically, the first material may have a coefficient of thermal expansion that is less than the second material. In this arrangement, deflection of walls 138, 140, 142, 144 may be generally opposite that described above and shown in FIG. 5.

As a result, exhaust gas regions 146, 148 may have an increased flow restriction relative to a non-operating condition of EGR cooler 128 (shown in FIG. 2). However, the increased restriction in exhaust gas regions 146, 148 created by the deflection of walls 138, 140, 142, 144 may be less than the restriction in exhaust gas regions 46, 48 created by the deflection of walls 38, 40, 42, 44 in FIG. 3. Coolant regions 150, 152, 154 may additionally have an increased flow restriction relative to a non-operating condition of EGR cooler 28. However, the increased restriction in coolant regions 150, 152, 154 created by the deflection of walls 138, 140, 142, 144 may be less than the restriction in coolant regions 50, 52, 54 created by the deflection of walls 38, 40, 42, 44 in FIG. 4.

Deflection of walls 138, 140, 142, 144 may remove particulate exhaust matter therefrom. The flow restriction of exhaust gas may increase exhaust gas velocities, further assisting in removal of particulate matter from walls 138, 140, 142, 144. The flow restriction of coolant may change the heat transfer characteristics in coolant regions 150, 152, 154.

First portions 156, 158, 160, 162 and second portions 164, 166, 168, 170 may be coupled in a variety of ways including brazing in order to prevent separation based on the different coefficients of thermal expansion.

What is claimed is:

1. An exhaust gas recirculation cooler comprising:

a housing including an exhaust gas region, a coolant region, an exhaust gas inlet that provides communication between an exhaust gas from an engine and the exhaust gas region, an exhaust gas outlet that provides communication between the exhaust gas region and an engine intake air supply, and a coolant inlet and a coolant outlet in communication with the coolant region and hydraulically isolated from the exhaust gas inlet and the exhaust gas outlet; and a first wall fixed within the housing and separating the exhaust gas region from the coolant region, the first wall including a first portion formed from a first material and facing the exhaust gas region and a second portion formed from a second material and facing the coolant region, one of the first and second materials having a coefficient of thermal expansion that is greater than the other of the first and second materials, the first wall being deflected toward one of the exhaust gas region and the coolant region during cooler operation based on a difference in the coefficient of thermal expansion of the first and second materials.

2. The exhaust gas recirculation cooler of claim 1, wherein the first wall is deflected in a direction generally perpendicular to a surface of one of the first and second portions.

3. The exhaust gas recirculation cooler of claim 1, wherein the deflection increases a flow restriction of the exhaust gas within the exhaust gas region.

4. The exhaust gas recirculation cooler of claim 3, wherein the deflection decreases a flow restriction of a coolant within the coolant region.

5. The exhaust gas recirculation cooler of claim 1, wherein the deflection decreases a flow restriction of the exhaust gas within the exhaust gas region.

6. The exhaust gas recirculation cooler of claim 5, wherein the deflection increases a flow restriction of a coolant within the coolant region.

7. The exhaust gas recirculation cooler of claim 1, wherein the first material has a greater coefficient of thermal expansion than the second material.

8. The exhaust gas recirculation cooler of claim 1, wherein the second material has a greater coefficient of thermal expansion than the first material.

9. The exhaust gas recirculation cooler of claim 1, wherein the deflection removes a particulate matter from the first wall.

10. The exhaust gas recirculation cooler of claim 1, further comprising a second wall fixed within the housing, the first and second walls defining first and second portions of the coolant region having the exhaust gas region disposed therebetween.

11. The exhaust gas recirculation cooler of claim 10, wherein the second portion of the first wall faces the first portion of the coolant region, the second wall including a first portion formed from one of the first and second materials and facing the second portion of the coolant region and a second portion formed from the other of the first and second materials and facing the exhaust gas region, the second wall being deflected toward one of the exhaust gas region and the second portion of the coolant region during cooler operation based on the difference in the coefficient of thermal expansion of the first and second materials.

12. The exhaust gas recirculation cooler of claim 11, wherein the first portion of the second wall is formed from the first material and the second portion of the second wall is formed from the second material.

13. The exhaust gas recirculation cooler of claim 11, wherein the first portion of the second wall is formed from the second material and the second portion of the second wall is formed from the first material.

14. The exhaust gas recirculation cooler of claim 10, wherein the first and second walls are deflected toward one another during cooler operation.

15. The exhaust gas recirculation cooler of claim 10, wherein the first and second walls are deflected away from one another during cooler operation.

16. The exhaust gas recirculation cooler of claim 10, wherein the first and second walls are deflected in generally the same direction during cooler operation.

17. The exhaust gas recirculation cooler of claim 1, further comprising a second wall fixed within the housing, the first and second walls defining first and second portions of the exhaust gas region having the coolant region disposed therebetween.

18. The exhaust gas recirculation cooler of claim 17, wherein the first portion of the first wall faces the first portion of the exhaust gas region, the second wall including a first portion formed from one of the first and second materials and facing the coolant region and a second portion formed from the other of the first and second materials and facing the second portion of the exhaust gas region, the second wall being deflected toward one of the second portion of the exhaust gas region and the coolant region during cooler operation based on the difference in the coefficient of thermal expansion of the first and second materials.

19. The exhaust gas recirculation cooler of claim 18, wherein the first portion of the second wall is formed from the first material and the second portion of the second wall is formed from the second material.

20. The exhaust gas recirculation cooler of claim 18, wherein the first portion of the second wall is formed from the second material and the second portion of the second wall is formed from the first material.

* * * * *